(12) United States Patent
Broniak et al.

(10) Patent No.: US 9,152,135 B2
(45) Date of Patent: Oct. 6, 2015

(54) APPLIANCE REMOTE CONTROL ENABLE MODE

(75) Inventors: Jay Andrew Broniak, Louisville, KY (US); John P. Ouseph, Prospect, KY (US); Ashley Wayne Burt, Louisville, KY (US); Kevin Dennis Mazzella, Prospect, KY (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 13/613,546

(22) Filed: Sep. 13, 2012

(65) Prior Publication Data

US 2014/0070927 A1    Mar. 13, 2014

(51) Int. Cl.
*G05B 15/02* (2006.01)
*D06F 33/02* (2006.01)

(52) U.S. Cl.
CPC ............... *G05B 15/02* (2013.01); *D06F 33/02* (2013.01); *G05B 2219/2642* (2013.01); *G08C 2201/93* (2013.01)

(58) Field of Classification Search
CPC ............ H04N 21/42204; D06F 2210/00; G08C 2201/42; G08C 2201/50; G08C 2201/91; G08C 2201/92; G08C 2201/93
See application file for complete search history.

(56) References Cited

U.S. PATENT DOCUMENTS

| | | | |
|---|---|---|---|
| 3,631,451 A | 12/1971 | Schmitt | |
| 5,127,045 A | 6/1992 | Cragun et al. | |
| 6,232,678 B1 | 5/2001 | Murata | |
| 6,665,384 B2 * | 12/2003 | Daum et al. | 379/102.03 |
| 6,816,060 B2 | 11/2004 | Dorr | |
| 7,834,740 B2 | 11/2010 | Dorr | |
| 8,594,304 B2 * | 11/2013 | Werth et al. | 379/265.05 |
| 2001/0046852 A1 | 11/2001 | Dorr | |
| 2002/0075160 A1 * | 6/2002 | Racz et al. | 340/825.69 |
| 2004/0242206 A1 | 12/2004 | Dorr | |
| 2009/0006970 A1 * | 1/2009 | Jeffery et al. | 715/733 |
| 2009/0125708 A1 * | 5/2009 | Woodring et al. | 713/1 |
| 2011/0025475 A1 | 2/2011 | Dorr | |
| 2012/0086868 A1 * | 4/2012 | Takaya | 348/734 |
| 2012/0302219 A1 * | 11/2012 | Vang | 455/414.1 |

FOREIGN PATENT DOCUMENTS

CN    101315730 B  *  5/2012

* cited by examiner

*Primary Examiner* — Brian Zimmerman
*Assistant Examiner* — Sara Samson
(74) *Attorney, Agent, or Firm* — Dority & Manning, P.A.

(57) ABSTRACT

A system and method of remotely interacting with an appliance system are provided. A remote device, such as a computer, a smartphone, a tablet, etc., can initiate communications with an appliance through a communications network. When a remote enablement mode is initiated at the appliance, the remote device can interact with the appliance. For instance, the remote device can initiate operational cycles, activate notifications, perform diagnostic routines, etc. The remote enablement mode can be initiated by a user within the proximity of the appliance using a remote enable interface. The remote enable interface can be a mechanical device, an electromechanical device, and/or a selection through a user interface coupled to the appliance.

16 Claims, 2 Drawing Sheets

APPLIANCE REMOTE CONTROL ENABLE MODE

FIELD OF THE INVENTION

The present disclosure relates to an appliance system coupled to a communication network, and more particularly to an improved system and method of remotely communicating with the appliance when the appliance is in remote enable mode.

BACKGROUND OF THE INVENTION

A premises such as a residential, commercial, or industrial location typically includes a variety of appliances. For example, appliances including refrigerators, microwave ovens, ovens, stoves, heating systems, cooling systems and the like can be provided at the premises. Conventionally, these appliances were stand alone and incapable of communicating with any other device.

More recently, appliances have included network interface devices and microcontrollers or microprocessors that allow the appliance to be remotely modified, such as programmed or reprogrammed, using communications transmitted over the network. However, these remote communications do not consider unexpected or unknown changes in the status of the appliance at the premises.

Thus, a need exists for an improved remote communication system for use within an appliance.

BRIEF DESCRIPTION OF THE INVENTION

Aspects and advantages of the invention will be set forth in part in the following description, or may be apparent from the description, or may be learned through practice of the invention.

One exemplary aspect of the present disclosure is directed to a computer-implemented method of controlling an appliance over a network. The method can include receiving, at the appliance, a request to interact with the appliance from a remote device; determining whether a remote enable interface is activated; and interacting with the remote device when the remote enable interface is activated.

Another exemplary aspect of the present disclosure is directed to a computer-implemented method of controlling an appliance over a network. The method can include transmitting, from a remote device, a request to interact with the appliance over the network; receiving a signal indicative of a remote enable interface status; and interacting with the appliance when the remote enable interface is activated.

Still another exemplary aspect of the present disclosure is directed to an appliance. The appliance can include a network interface coupled to a network, a remote enable interface configured to enable remote access to the appliance over the network, and a controller. The controller can be configured to provide remote access to a remote device when the remote enable interface is activated.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
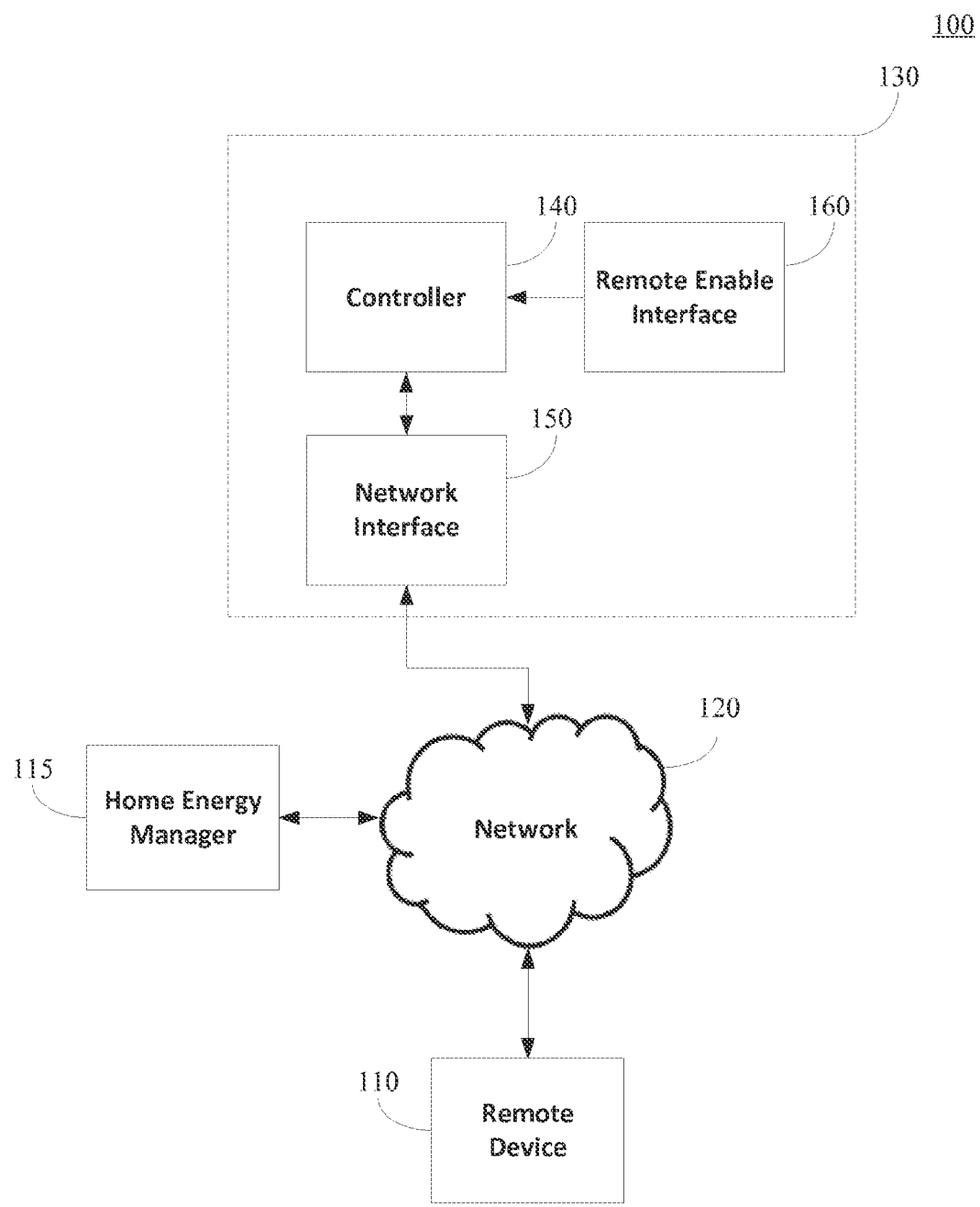
FIG. 1 depicts a block diagram of a system for remotely interacting with an appliance system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to a system and method of remotely interacting with an appliance system. A remote device, such as a computer, a smartphone, a tablet, etc., can initiate communications with an appliance through a communications network. When a remote enablement mode is initiated at the appliance, the remote device can interact with the appliance. For instance, the remote device can control operational cycles, activate notifications, perform diagnostic routines, etc. The remote enablement mode can be initiated by a user within the proximity of the appliance using a remote enable interface. The remote enable interface can be a mechanical device, an electromechanical device, and/or a selection through a user interface coupled to the appliance.

FIG. 1 illustrates an exemplary system 100 for remotely interacting with an appliance according to an exemplary embodiment of the present disclosure. The system 100 can include a remote device 110, a communication network 120, and an appliance 130. The appliance 130 can include a controller 140, network interface 150, and a remote enable interface 160.

Remote device 110 can be any device configured to communicate over a communication network. For instance, remote device 110 can include a computer, a smartphone, a tablet, etc. The remote device 110 can include an interface that allows the remote device 110 to initiate communications with appliance 130 over the network 120.

Appliance 130 can be any appliance used on a premises such as a HVAC system, a refrigerator, a washer, a dryer, an oven, a cooktop, a range, and a microwave. The appliance 130 can include a network interface 150 to couple the appliance with a communication network 120 such that the appliance can transmit and receive information over the network. 120

The appliance 130 can further include a remote enable interface 160 to initiate a remote enablement mode. The remote enable interface 160 can be any type of device configured to be actuated by a user. For instance, the remote enable interface 160 can be a mechanical or electromechanical element, such as a button or switch, provided on a display of the appliance. In another embodiment, a user interface, such as a user interface presented on a liquid crystal display device, can display an option to initiate the remote enablement mode. A user can interact with the display such that the remote enable interface 160 enables the remote enablement mode in the appliance.

A user can interact with the remote enable interface 160 when the user is within a predetermined perimeter of the appliance 130. For instance, the user can observe the current state of the appliance and actuate the remote enable interface 160. In one implementation, the user can actuate the remote enable interface 160 using a wireless device. When the user enters a predetermined proximity range of the appliance 130, the user can interact with the appliance 140 via the wireless device and actuate the remote enable interface 160.

Controller 140 can determine whether the remote enable interface 160 is activated and can activate a remote enablement mode in the appliance based on the interface 160 activation. The controller 140 can be positioned in any location with the appliance 130. In addition, controller 140 can be the only controller in the appliance 130 such that controller 140 controls all operations of the appliance. Alternatively, controller 140 can be a sub-controller coupled to the overall appliance controller. If controller 140 is a sub-controller, it can be located with the overall appliance controller or be separate from the overall appliance controller.

By way of example, any/all of the "controllers" discussed in this disclosure can include a memory and one or more processing devices such as microprocessors, CPUs or the like, such as general or special purpose microprocessors operable to execute programming instructions or micro-control code associated with operation of an appliance 130. The memory can represent random access memory such as DRAM, or read only memory such as ROM or FLASH. In one embodiment, the processor executes programming instructions stored in memory. The memory can be a separate component from the processor or can be included onboard within the processor. Alternatively, the controller might also be constructed without using a microprocessor, using a combination of discrete analog and/or digital logic circuitry (such as switches, amplifiers, integrators, comparators, flip-flops, AND gates, and the like) to perform control functionality instead of relying upon software.

In a particular embodiment of the present disclosure, the controller 140 can monitor the remote enable interface 160 to determine whether the remote enable interface 160 has been activated. When the remote enable interface 160 has been activated, the controller 140 can activate a remote enablement mode in the appliance that allows a remote device 110 to communicate with the appliance. When the remote enable interface 160 has not been activated, a remote device 110 cannot remotely communicate with the appliance 140.

After the controller 140 activates the remote enablement mode and a request to initiate communications has been received by the controller 140 from the remote device 110, the remote device 110 can interact with the appliance 130. For instance, the remote device 110 can control the appliance such as initiating operational cycles, discontinuing operational cycles, or delaying the initiation of an operational cycle by a selected time period. In addition, the remote device 110 can also remotely activate notifications such that the notifications appear on a display of the appliance 140, perform diagnostic routines to determine a service status of the appliance 140, request user input, and order parts or supplies for the appliance 140.

When the communication session initiated by the remote device 110 is completed, the remote enable interface 160 can be disabled either by the remote device 110 or the appliance 140. The remote enable interface 160 can also be enabled until a user disables the interface 160. In addition, the remote enable interface 160 can remain enabled until an operational cycle in the appliance ends and then the interface 160 can automatically be disabled following the completion of the operational cycle.

In one implementation of the present disclosure, the system 100 can include a home energy manager 115. Controller 140 of the appliance 130 can initiate communications with the home energy manager 115 over the network 120 using the network interface 150. A signal indicative of the status of the remote enable interface 160 can be sent from the appliance to the home energy manager 115. The status of the remote enable interface 160 can be retrieved by the remote device. The remote device 110 can communicate with the home energy manager 115 over the network 120 to determine whether the remote enable interface 160 has been activated. The remote device 110 can then communicate with the appliance 130 either directly using the network interface 150 or indirectly such that the home energy manager 115 facilitates transfer of the communications between the remote device 110 and the appliance 130.

Figure 2:
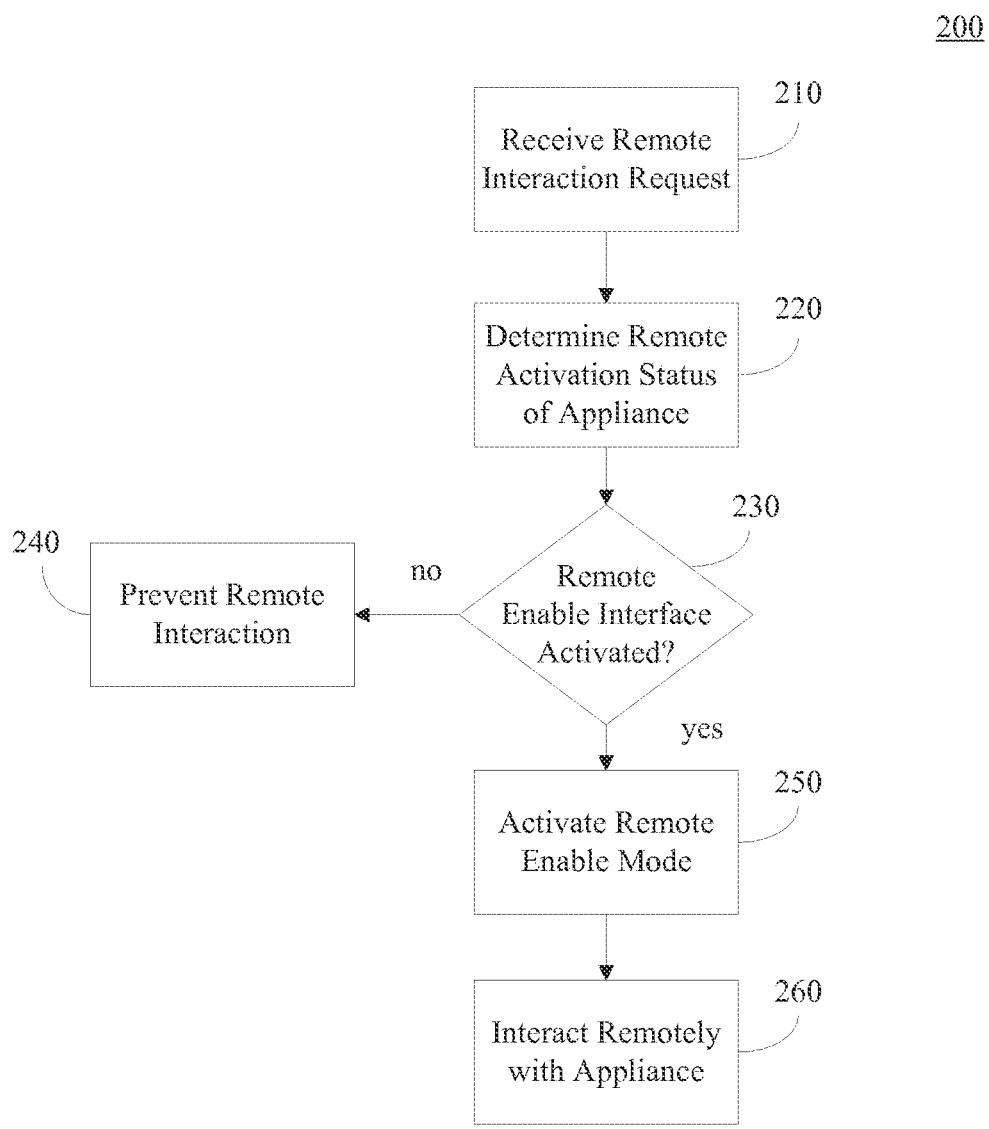
FIG. 2 depicts a flow chart of a method according to an exemplary embodiment of the present disclosure.

FIG. 2 illustrates a flow chart of an exemplary method 200 according to exemplary embodiments of the present disclosure. The method 200 can be implemented with any suitable home appliance system, such as the systems illustrated in FIG. 1. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

FIG. 2 provides a flow chart of an exemplary method 200 of remotely interacting with an appliance according to an exemplary embodiment of the present disclosure. At (210), an appliance can receive a request for remote interaction and determine the status of a remote enable interface at (220). It can be determined whether the remote enable interface is activated in (230). When the remote enable interface is not activated, remote interaction is prevented in (240). When the remote enable interface is activated, a remote enable mode can be activated at the appliance in (250) and the remote device can remotely interact with the appliance at (260).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of controlling an appliance over a network, comprising:

receiving, by one or more processors associated with an appliance, a request to interact with the appliance from a remote device;

determining by the one or more processors, whether a remote enable interface is activated;

interacting, by the one or more processors, with the remote device when the remote enable interface is activated, the interaction being associated at least in part with an operational cycle of the appliance; and responsive to the completion of the operational cycle, ceasing, by the one or more processors, interacting with the remote device;
wherein ceasing interacting with the remote device comprises automatically deactivating the remote enable interface.

2. The computer-implemented method as in claim 1, wherein the remote enable interface is configured to be enabled by a user within a predetermined proximity of the appliance.

3. The computer-implemented method as in claim 1, further comprising preventing interaction between the appliance and the remote device when the remote enable interface is disabled.

4. The computer-implemented method as in claim 1, wherein the remote enable interface is at least one of a mechanical device and an electromechanical device.

5. The computer-implemented method as in claim 1, wherein the remote enable interface is enabled through a user interface associated with the appliance.

6. The computer-implemented method as in claim 1, wherein the network is a home appliance network.

7. A computer-implemented method of controlling an appliance over a network, comprising:
transmitting, by one or more processors, a request to interact with the appliance over the network;
receiving, by the one or more processors, a signal indicative of a remote enable interface status;
interacting, by the one or more processors, with the appliance when the remote enable interface is activated, the interaction comprising at least one of remote services diagnostics, ordering items related to the appliance, notifications, or remote control of the appliance; and
responsive to the completion of the interaction, automatically deactivating by the one or more processors, the remote enable interface.

8. The computer-implemented method as in claim 7, wherein the remote enable interface is configured to be enabled by a user within a predetermined proximity to the appliance.

9. The computer-implemented method as in claim 7, further comprising preventing interaction with the appliance when the remote enable interface is disabled at the appliance.

10. The computer-implemented method as in claim 7, further comprising requesting information regarding an operational state of the appliance when the remote enable interface is activated.

11. The computer-implemented method as in claim 10, further comprising transmit ing a command to change the operational state of the appliance.

12. The computer-implemented method as in claim 7, further comprising transmitting the request to interact with the appliance of the network to a server separate from the appliance, wherein the appliance interacts with the server to receive the remote device request.

13. An appliance comprising:
a network interface coupled to a network;
a remote enable interface configured to enable remote access to the appliance over the network; and
a controller configured to provide remote access to a remote device when the remote enable interface is activated, and, responsive to an interaction request received from the remote device, to interact with the remote device, the interaction comprising at least one of remote services diagnostics, ordering items related to the appliance, notifications, and remote control of an operational cycle of the appliance;
wherein, responsive to the completion of the interaction the controller is further configured to terminate access to the remote device by automatically deactivating the remote enable interface.

14. The appliance as in claim 13, wherein the remote enable interface is at least one of a mechanical device and an electromechanical device.

15. The appliance as in claim 13, wherein the remote enable interface is enabled by a user within a predetermined proximity of the appliance.

16. The appliance as in claim 13, wherein the appliance is at least one of a HVAC system, a refrigerator, a washer, a dryer, an oven, a cooktop, and a range.

\* \* \* \* \*

UNITED STATES PATENT AND TRADEMARK OFFICE
CERTIFICATE OF CORRECTION

PATENT NO.        : 9,152,135 B2
APPLICATION NO.   : 13/613546
DATED             : October 6, 2015
INVENTOR(S)       : Broniak et al.

It is certified that error appears in the above-identified patent and that said Letters Patent is hereby corrected as shown below:

In the claims

Claim 11, Column 6, Line 9: delete "transmit ing" and insert --transmitting.--

Signed and Sealed this
Second Day of August, 2016

Michelle K. Lee
*Director of the United States Patent and Trademark Office*